_United States Patent Office_

3,033,696
Patented May 8, 1962

3,033,696
MANUFACTURE OF RAYON
Aart Buurman, Velp, and Pieter Coenraad Limburg and Robbert Aldert Vroom, Arnhem, Netherlands, assignors to American Enka Corporation, Enka, N.C., a corporation of Delaware
No Drawing. Filed Feb. 18, 1959, Ser. No. 793,967
Claims priority, application Netherlands Mar. 18, 1958
10 Claims. (Cl. 106—165)

This invention relates to the manufacture of viscose rayon and more particularly to an improved process for making rayon and to an improved viscose spinning solution.

In our copending United States patent application Serial No. 747,360, filed July 9, 1958, now Patent No. 2,978,292, and having common ownership herewith, a process is described for the manufacture of viscose rayon in which a viscose solution containing polymers of an epoxyalkane in quantities of 0.1–1% by weight (calculated on the viscose) and a compound of the general formula:

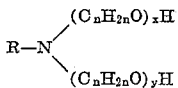

in which R is an aliphatic chain having at least 8 carbon atoms, $n$ is 2, 3 or 4, and $x$ plus $y$ is at least 2 with $x$ and $y$ being at least one, is spun into an acid coagulating bath.

By means of this process threads are obtained which when combined and twisted together form a cord having reduced twisting losses. Twisting losses are the decrease in strength of the manufactured cord over the sum of the strengths of the composite threads.

It has now been found that by combining the polymers of the epoxyalkane with certain amines in a specific ratio and an organic compound which irreversibly binds the sulfide ions in the viscose, an increase in cord strength may be obtained.

It is an object of this invention to provide a method for producing rayon yarn having improved physical properties by utilizing a novel combination of modifiers.

It is a further object of this invention to provide a new viscose spinning solution.

These and other objects will be apparent from the following detailed description.

The present invention consists of a process of spinning into an acid spin bath, a viscose solution that contains in addition to a polymer of epoxyalkane and a compound or a quaternary ammonium salt of the compound of the general formula:

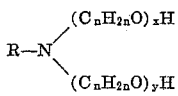

in which R is an aliphatic radical with at least 8 carbon atoms, in which $n$ is 2, 3 or 4 and $x$ plus $y$ is at least 2, and $x$ and $y$ are at least 1, an organic compound that irreversibly binds the sulfide ions in the viscose. The compound that is used is added to the viscose immediately before spinning. The quantity of the substituted amines added amounts to 15 to 40% by weight of the total amount of the epoxyalkane polymer and substituted amines. It is also part of this invention to provide a new viscose spinning solution containing the above mentioned materials.

In general, the substituted amines used are the ones in which R consists of an aliphatic chain having 8 to 24 carbon atoms. Amines in which $n$ equals 2 may be considered for use. The total number of $(C_nH_{2n}O)$ units in the amines used preferably lies between 5 and 25. However, amines having a higher number of $(C_nH_{2n}O)$ units may also be used.

Examples of amines of the formula:

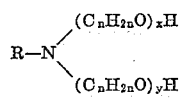

are the products marketed under the names of Ethomeen C/15, Ethomeen C/20, Ethomeen C/25, Ethomeen C/60, Ethomeen S/15, Ethomeen S/20, Ethomeen S/25, Ethomeen S/60, Ethomeen T/20, Ethomeen T/25, Ethomeen T/60 and Hüls V1011T.

The Ethomeens are prepared by reacting amines derived from higher fatty acids with ethylene oxide. In this way the C-Ethomeens are derived from coconut oil, the S-Ethomeens from soybean oil, and the T-Ethomeens from tallow. The numbers 15, 20, 25 and 60 following the capitals indicate, after a deduction by 10, the number of ethylene oxide molecules which have reacted with one molecule of the amine.

Hüls V1011T is a representative of the group of compounds of the formula:

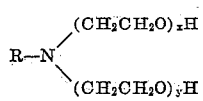

in which R represents an alkyl radical having 8 to 24 carbon atoms, $x$ plus $y$ has a value of between 5 and 25 and $x$ and $y$ are at least one.

Another type of substituted amines are the quaternary ammonium salts mentioned above which are sold under the name of Ethoquads and have the general formula:

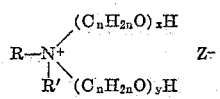

in which R is an aliphatic radical with at least 8 carbon atoms; R′ may be an alkyl, aryl, or alicyclic radical with R′ preferably being an alkyl radical containing one to three carbon atoms; Z represents an anion having substantially no surface activity such as hydroxide, halide, sulfate, acetate, etc., preferably being a chloride; $x$ plus $y$ are whole numbers of at least one with the preferred combined value of $x$ plus $y$ being 2 to 50; and $n$ is a whole number, possibly one but preferably two and no more than four.

The Ethoquads may be prepared from the above described amines by reacting the amine with an alkyl chloride, preferably methyl chloride.

Examples of these Ethoquads are:

(1)

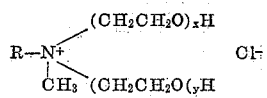

wherein the amine is derived from coconut oil and $x$ plus $y$ equals 2.

(2)

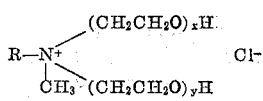

wherein the amine is derived from coconut oil and $x$ plus $y$ equals 10.

(3)

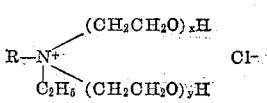

(4)

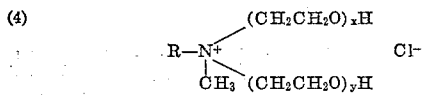

wherein the amine is derived from soybean oil and $x$ plus $y$ equals 15.

(5)

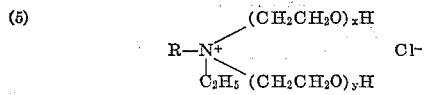

wherein the amine is derived from n-octadecylamine and $x$ plus $y$ equals 50.

If the aforementioned amines together with epoxyalkane polymers in the stated amount of 15 to 40% by weight, calculated on the mixture of the epoxyalkane polymers and the amines, are added to viscose to which just prior to spinning, an organic compound which irreversibly binds the sulfide ions in the viscose has been added, threads may be obtained which when corded have greater strength than when the latter compounds are not used. The reason for this improvement is not definitely known, but it is believed to be attributed to the irreversible binding of the sulfide ions in the viscose by the use of these latter compounds. Examples of these compounds are formaldehyde, ethylene oxide, or acrylonitrile.

The correct amount of the nitrogen-containing compound within said range depends on the structure of the amine, as well as on the epoxyalkane polymer used.

For instance, when using polyepoxyethane having a molecular weight of 3000, it is preferred to use the commercial product Hüls V1011T in an amount of 25% by weight (calculated on the total weight of the polyepoxyethane and the amine). If it is desiried to use an Ethomeen in place of the Ethomeen, the Ethoquad as shown by Formula Number 4 in an amount of 33% by weight (calculated as above) should preferably be used.

To obtain satisfactory and improved cord strengths it has been found that the ripeness of the viscose should not be changed by the addition of the organic compound. This is obtained by utilizing such a small amount of these compounds that only reaction with the sulfide ions in the viscose occurs and none occurs with the cellulose xanthate. In addition, these compounds should be added immediately prior to spinning. For this reason, 0.1 to 0.25 mole of these compounds per kg. of viscose are added to the viscose as close as possible to the spinneret. Preferably this is carried out by injecting said compound into the viscose flowing between the spinning tank and the spinneret. This may be injected in the same manner that a dye dispersion is added to the viscose as described in U.S. patent application Serial No. 430,813, filed May 19, 1954 now Patent No. 2,934,448, and having common ownership herewith.

Therefore, these compounds react only with the sulfur containing by-products in the viscose, such as sodium sulfide and sodium trithiocarbonate, which compounds have been formed by hydrolysis of the cellulose xanthate. In this case the ripeness of the viscose is not changed and the sulfide ions are irreversibly bound.

It is known to add acrylonitrile to viscose. However, the amount added and the time of addition are such that it reacts not only with the sulfur containing by-products, but also with the cellulose xanthate. In these cases, the ripeness of the viscose is changed which is contrary to this invention.

The epoxyalkane polymers which are used in combination with the above mentioned nitrogen containing compounds and organic compounds that irreversibly bind sulfide ions in the viscose may be straight polymers, copolymers, or so-called block polymers of epoxyalkane or substitution products thereof. The epoxy compounds from which the polymers used are prepared have the general formula:

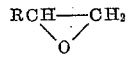

in which R represents hydrogen, an alkyl group, a cycloalkyl group or an aryl group. Examples thereof are epoxyethane and epoxypropane. An example of a block copolymer is $HO(C_2H_4O)_a(C_3H_6O)_b(C_2H_4O)_cH$, in which $b$ equals 30 and $a$ plus $c$ equals 85. Of these polymers, an amount of between 0.2 to 0.5% by weight, calculated on the viscose, is generally added to the spinning solution.

With an amount of 0.2% by weight of the polyepoxyalkane, the amount of the amine or its quaternary ammonium salt lies approximately between 0.04 and 0.11% by weight, calculated on the viscose.

Although it is possible to operate with spinning baths having a sulfuric acid content of 10% by weight and higher, it has been found preferable, in connection with the properties of the threads, such as the strength and the swelling in water, to operate the spinning baths in which the sulfuric acid content is less than 7% by weight.

The zinc content in the spinning baths may vary considerably above the minimum of 2% by weight and may amount, for example, to 10% by weight and higher. For economic reasons the lower percentages deserve preference.

The stretching which is necessary to obtain threads having the required properties may be carried out in a so-called one bath process as well as in a second bath and in one or more stages.

The invention will be further explained with reference to the following examples which are to be regarded by no means as restrictive. In these examples the composition of the viscose, the spinning bath, etc., is expressed in percentages by weight.

EXAMPLE I

A viscose spinning solution was prepared with a cellulose content of 7.3% and an alkali content of 5.5% as well as 0.15% of polyethylene oxide (calculated on the viscose) having a molecular weight of about 4000. This solution was spun with a ripeness of 12 (Hottenroth number) into an aqueous spinning bath maintained at 50° C. and containing 4.7% sulfuric acid, 13.0% sodium sulfate, 4.5% zinc sulfate, and per kg. of viscose, 40 mg. lauryl pyridinium chloride. In the spinning bath, the freshly spun thread was immersed for a distance of 100 cm., passing through a two diameter tube. The first portion of the tube had a length of 40 cm. with a diameter of 20 mm. and the second portion a length of 20 cm. with a diameter of 30 mm. The thread was then passed into a second bath containing 2.5% sulfuric acid where it was stretched 100%. The temperature of the second bath was 95° C. The length of immersion in the second bath was 150 cm. The speed at which the thread was then collected on a spool amounted to 65 m./min. The thread obtained was thereafter washed free from acid in the usual manner, finished and dried under tension after which the properties were determined. The thread had a total denier of 1800 and consisted of 1000 filaments. Two of such threads were wound on a spool and from the spool they were corded with 470 turns per meter and had a total denier of 3750.

The strength at rupture of the cord in a conditioned state, i.e., conditioned in air at 20° C. and a relative humidity of 65% and in an oven-dry state was 12.5 and 14.7 kg., respectively.

EXAMPLE II

A viscose spinning solution was prepared with a cellulose content of 7.3% and an alkali content of 5.5% containing 0.15% of polyethylene oxide (based on the viscose) having a molecular weight of about 4000 as well as 0.05% of the compound sold under the trade name of Ethomeen C/15. This solution was spun at a ripeness of 11.5 (Hottenroth number) in the same manner as in Example I. The freshly spun thread was treated in the same manner as in Example I. The cord obtained from this thread had a denier of 3750 and 470 turns per meter. The strength of the cord in conditioned state was 13.0 kg. and oven-dry state was 15.2 kg.

EXAMPLE III

A viscose spinning solution was prepared with a cellulose content of 7.5% and an alkali content of 5.6% containing 0.7% of polyethylene oxide (based on the viscose) having a molecular weight of about 1500 as well as 0.2% of the compound of the formula:

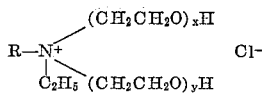

in which the amine was derived from coconut oil and $x$ plus $y$ equals 15. This solution was spun at a ripeness of 11 (Hottenroth number) into an aqueous spinning bath maintained at 46° C., and containing 5.0% sulfuric acid, 12.0% sodium sulfate and 6.0% zinc sulfate. The freshly spun thread was treated in the same manner as in Example I. The cord obtained from the thread had a denier of 3750 and 470 turns per meter. The strength of the cord in conditioned state was 12.9 kg. and in oven-dry state was 15.1 kg.

EXAMPLE IV

A viscose spinning solution was prepared with a cellulose content of 7.5% and an alkali content of 5.6% containing 0.3% polyethylene oxide (based on the viscose) having a molecular weight of about 1500. Immediately before the solution reached the spinning pump, 0.2% of acrylonitrile (based on the viscose) was injected into it. The solution was then spun into an aqueous spinning bath containing 6.0% sulfuric acid, 15.0% sodium sulfate and 5.0% zinc sulfate. The solution had a ripeness prior to the injection of acrylonitrile of 12.5 (Hottenroth number) and after leaving the spinneret, it had a ripeness of 12.5. The freshly spun thread was treated in the same manner as in Example I. The cord obtained from this thread had a denier of 3750 and 470 turns per meter and strength in conditioned and oven-dry state of 13.0 and 14.9 kg., respectively.

EXAMPLE V

A viscose spinning solution was prepared with a cellulose content of 7.5% and an alkali content of 5.6% containing 0.7% polyethylene oxide (based on the viscose) having a molecular weight of about 4000. Immediately before the solution reached the spinning pump, 0.04% formaldehyde (based on the viscose) in the form of a 40% aqueous solution was injected into it. The solution was then spun as in Example IV. The solution had a ripeness prior to addition of formaldehyde of 12.5 (Hottenroth number) and after leaving the spinneret, it had a ripeness of 12.5. The freshly spun thread was treated in the same manner as in Example I. The cord obtained from this thread had a denier of 3750 and 470 turns per meter. The strength of this cord in conditioned state was 12.8 kg. and in oven-dry state was 14.8 kg.

EXAMPLE VI

A viscose spinning solution was prepared with a cellulose content of 7.3% and an alkali content of 5.5% containing 0.15% polyethylene oxide (based on the viscose) having a molecular weight of about 2700 as well as 0.07% Ethomeen C/25. Immediately before the solution reached the spinning pump, 0.5% acrylonitrile (based on the viscose) was injected into it. The solution was then spun in the same manner as in Example I. The solution had a ripeness prior to injection of acrylonitrile of 12 (Hottenroth number) and after leaving the spinneret, it had a ripeness of 12. The freshly spun thread was treated in the same manner as in Example I. The cord obtained from this thread had a denier of 3750 and 470 turns per meter. The strength of the cord in conditioned state and oven-dry state was 14.1 and 15.6 kg., respectively.

EXAMPLE VII

A viscose spinning solution was prepared with a cellulose content of 5.5% and an alkali content of 3.8% containing 0.2% polyethylene oxide (based on the viscose) having a molecular weight of 2700 as well as 0.06% of the compound of the formula:

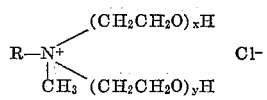

in which the amine was obtained from soybean oil and $x$ plus $y$ equals 15. Immediately before the solution reached the spinning pump, 0.15% acrylonitrile (based on the viscose) was injected into it. The solution was then spun into an aqueous spin bath maintained at 50° C. and containing 3.5% sulfuric acid, 12.0% sodium sulfate and 6.0% zinc sulfate. The solution had a ripeness prior to injection of acrylonitrile of 11.8 (Hottenroth number) and after leaving the spinneret it had a ripeness of 11.8. The freshly spun thread was treated in the same manner as in Example I. The cord obtained from this thread had a denier of 3750 and 470 turns per meter. The strength of the cord in conditioned state was 14.3 kg., and in oven-dry state was 15.9 kg.

EXAMPLE VIII

A viscose spinning solution was prepared with a cellulose content of 7.3% and an alkali content of 5.5% containing 0.4% polyethylene oxide (based on the viscose) having a molecular weight of 2700 as well as 0.1% Ethomeen S/15. Immediately before the solution reached the spinning pump, 0.04% formaldehyde (based on the viscose) in the form of a 40% aqueous solution was injected into it. The solution was then spun into an aqueous spin bath maintained at 50° C. and containing 4.7% sulfuric acid, 13.0% sodium sulfate and 4.5% zinc sulfate. The solution had a ripeness prior to injection of formaldehyde of 12 (Hottenroth number) and after leaving the spinneret it had a ripeness of 12. The freshly spun thread was treated in the same manner as in Example I. The cord obtained from this thread had a denier of 3750 and 470 turns per meter. The strength of the cord in conditioned state and oven-dry state was 13.8 and 15.3 kg., respectively.

EXAMPLE IX

A viscose spinning solution was prepared with a cellulose content of 5.5% and an alkali content of 3.8%, containing 0.2% polyethylene oxide (based on the viscose) having a molecular weight of 4000 as well as 0.05% of the compound of the formula:

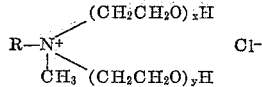

in which the amine was derived from soybean oil and $x$ plus $y$ equals 15. Immediately before the solution reached the spinning pumps, 0.15% formaldehyde (based on the viscose) in the form of a 40% aqueous solution was injected into it. The solution was then spun in the same manner as in Example VII. The solution had a ripeness prior to injection of formaldehyde of 11.8 (Hottenroth number) and after leaving the spinneret, it had a ripeness of 11.8. The freshly spun thread was treated in the same manner as in Example I. The cord obtained from this thread had a denier of 3750 and 470 turns per meter. The strength of the cord in conditioned state was 13.9 kg. and in oven-dry state was 15.5 kg.

The following Table I summarizes the foregoing examples. It clearly shows that higher cord strengths are obtained by the use of all four of the compounds of this invention than can be obtained by using any one, any two, or any three of these compounds.

Table I

| Sample No. | Polyethylene Oxide | Ethomeen or Ethoquad | Sulfide Binding Organic Compound | Strength of Cord | |
|---|---|---|---|---|---|
| | | | | Cond. | Oven-dry |
| I | yes | no | no | 12.5 | 14.7 |
| II | yes | yes | no | 13.0 | 15.2 |
| III | yes | yes | no | 12.9 | 15.1 |
| IV | yes | no | yes | 13.0 | 14.9 |
| V | yes | no | yes | 12.8 | 14.8 |
| VI | yes | yes | yes | 14.1 | 15.6 |
| VII | yes | yes | yes | 14.3 | 15.9 |
| VIII | yes | yes | yes | 13.8 | 15.3 |
| IX | yes | yes | yes | 13.9 | 15.5 |

While preferred embodiments of the invention have been shown, it is to be understood that changes and variations may be made without departing from the spirit and scope of the invention so defined by the appended claims.

What is claimed is:

1. A method of producing viscose rayon comprising spinning into an acid coagulating bath, a viscose solution having incorporated therein 0.1–1.0% of an epoxyalkane polymer of the class consisting of polyethylene oxide and polypropylene oxide; a compound of the group consisting of a compound of the general formula:

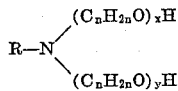

in which R is an aliphatic chain having at least 8 carbon atoms, $n$ is 2, 3 or 4, $x$ plus $y$ is at least 2 and not more than 50 and $x$ and $y$ are at least one and a compound of the general formula:

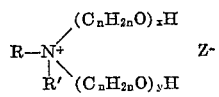

in which R is an aliphatic chain having at least 8 carbon atoms, R' is an organic radical of the group consisting of alkyl, aryl and alicyclic, Z is an innocuous anion, $n$ is 2, 3 or 4, $x$ plus $y$ is at least 2 and not more than 50, and $x$ and $y$ are at least one wherein the quantity of said compound is 15–40% by weight of the total amount of the epoxyalkane polymer and said compound; and about 0.01 to 0.25 mole per kilogram of viscose of an organic compound which binds irreversibly the sulfide ions in the viscose, said organic compound being added to the viscose solution just prior to spinning and selected from the group consisting of formaldehyde, ethylene oxide, and acrylonitrile.

2. The method of claim 1 wherein the epoxyalkane polymer is polyethylene oxide.

3. The method of claim 1 wherein the substituted amine compound added has the formula:

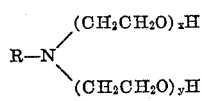

in which R is an alkyl radical having 8–24 carbon atoms, $x$ plus $y$ has a value between 5 and 25 and $x$ and $y$ are at least one.

4. The method of claim 1 wherein the substituted amine compound added has the formula:

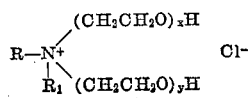

in which R is an alkyl radical having 8–24 carbon atoms, R' is an alkyl radical having 1–3 carbon atoms, $x$ plus $y$ has a value between 5 and 25 and $x$ and $y$ are at least one.

5. The method of claim 1 wherein the organic compound added is formaldehyde.

6. The method of claim 1 wherein the organic compound added is acrylonitrile.

7. A viscose spinning solution containing 0.1–1.0% by weight of a polymer of an epoxyalkane of the class consisting of polyethylene oxide and polypropylene oxide; a compound of the group consisting of a compound of the general formula:

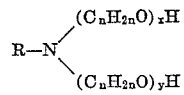

in which R is an aliphatic chain having at least 8 carbon atoms, $n$ is 2, 3 or 4, $x$ plus $y$ is at least 2 and not more than 50 and $x$ and $y$ are at least one and a compound of the general formula:

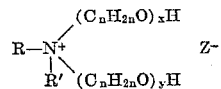

in which R is an aliphatic chain having at least 8 carbon atoms, R' is an organic radical of the group consisting of alkyl, aryl and alicyclic, Z is an innocuous anion, $n$ is 2, 3 or 4, $x$ plus $y$ is at least 2 and not more than 50, and $x$ and $y$ are at least one wherein the quantity of said compound is 15–40% by weight of the total amount of the epoxyalkane polymer and said compound; and about 0.01 to 0.25 mole per kilogram of viscose of an organic compound which binds irreversibly the sulfide ions in the viscose, said organic compound being selected from the group consisting of formaldehyde, ethylene oxide, and acrylonitrile.

8. The viscose spinning solution of claim 7 wherein the substituted amine compound added has the formula:

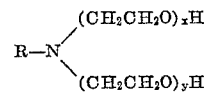

in which R is an alkyl radical having 8–24 carbon atoms, $x$ plus $y$ has a value between 5 and 25 and $x$ and $y$ are at least one.

9. The viscose spinning solution of claim 7 wherein the substituted amine compound added has the formula:

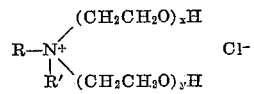

in which R is an alkyl radical having 8–24 carbon atoms, R' is an alkyl radical having 1–3 carbon atoms, $x$ plus $y$ has a value between 5 and 25 and $x$ and $y$ are at least one.

10. The viscose spinning solution of claim 7 wherein the organic compound is selected from the group consisting of formaldehyde and acrylonitrile.

References Cited in the file of this patent

UNITED STATES PATENTS

| Re. 24,486 | Mitchell | June 10, 1958 |
| 2,422,021 | Kline et al. | June 10, 1947 |
| 2,852,334 | Hollihan et al. | Sept. 16, 1958 |
| 2,962,341 | Cox | Nov. 29, 1960 |

FOREIGN PATENTS

| 489,234 | Great Britain | July 21, 1938 |
| 541,099 | Great Britain | Nov. 12, 1941 |
| 557,218 | Great Britain | Nov. 10, 1943 |
| 741,727 | Great Britain | Dec. 15, 1955 |
| 1,012,025 | Germany | July 11, 1957 |
| 1,023,559 | Germany | Jan. 30, 1958 |